N. A. PATTERSON.

Harrow.

No. 27,150.

Patented Feb. 14, 1860.

Witnesses:
M. P. Smith
R. M. Kimbrough

Inventor:
N. A. Patterson

UNITED STATES PATENT OFFICE.

N. A. PATTERSON, OF KINGSTON, TENNESSEE.

IMPROVEMENT IN HARROWS.

Specification forming part of Letters Patent No. 27,150, dated February 14, 1860.

*To all whom it may concern:*

Be it known that I, N. A. PATTERSON, of Kingston, in the county of Roane and State of Tennessee, have invented a new and useful Improvement in Harrows and Cultivators; and I do hereby declare that the following is a full, clear, and exact description of the same, reference being had to the annexed drawings, making a part of this specification, in which—

Figure 1:
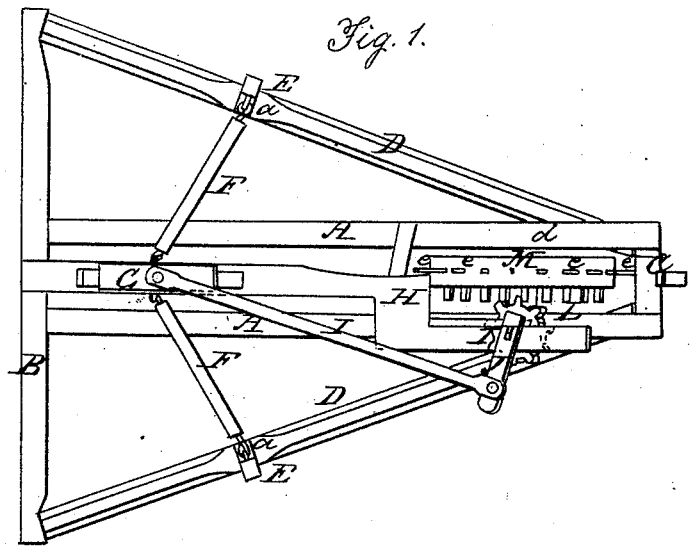
Figure 2:
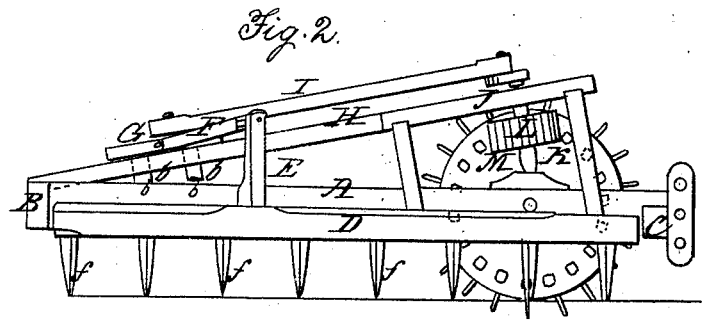

Figure 1 is a plan or top view of my invention; Fig. 2, a side view of the same.

Similar letters of reference indicate corresponding parts in the two figures.

To enable those skilled in the art to fully understand and construct my invention, I will proceed to describe it.

A A represent two parallel bars, to the back ends of which a bar, B, is attached at right angles, the front ends of the bars A A being connected by a cross-bar, C. The bar B extends some distance beyond the sides of the bars A A, as shown clearly in Fig. 1.

D D are two shafts, answering to the side rails of the common triangular harrow, the front ends of which are provided with journals that are fitted in the cross-bar C and the back ends provided with journals that are fitted in the outer part of the bar B. The shafts or side D D are allowed to turn or work freely in their bearings, and each bar has an upright, E, attached to it, to the upper ends of which rods F are connected by hooks a, the inner ends of said rods being attached to a slide, G, which works on an inclined bar, H, secured to the parallel bars A A. The slide G may be secured to the inclined bar H by having the latter slotted longitudinally and pins b attached to the under side of slide G, said pins passing through the slot in bar H and keyed underneath, as shown at c c, Fig. 2. The slide G is connected by rod, I to a crank, J, at the upper end of a shaft, K, which is stepped on one of the bars A, and has a pinion, L, placed on it, said pinion gearing into a toothed wheel, M, the axle d of which is fitted in the front parts of the bars A A. The periphery of the wheel M is provided with spurs or points e.

To the shafts or side rails, D D, teeth f are attached. These teeth f may be of the usual form—such as are applied to harrows—or cultivator-teeth may be employed. If a harrow is desired, of course harrow-teeth would be used, and cultivator-teeth be employed if the implement is designed for the cultivation of growing crops. I do not, however, confine myself to any particular form of teeth, nor to any particular way of adjusting them to their shafts D D.

The operation is as follows: The team or draft-animal is attached to the cross-bar C, and as the implement is drawn along the wheel M is rotated, and said wheel, through the medium of the pinion L, rotates the shaft K, the crank J of which, in connection with the rod I, gives a reciprocating motion to the slide G, and the latter, through the medium of the rods F and uprights E, gives a vibratory movement to the shafts or side rails, D D, and consequently to the teeth f, which are attached thereto, the teeth by this movement acting on the earth in a far more effectual manner than heretofore, whether the implement be used in the capacity of a harrow or a cultivator.

What I claim as my invention, and desire to secure by Letters Patent, is—

The arrangement of the shafts or side rails, D, with the mechanism for vibrating them, substantially as and for the purposes herein set forth and described.

N. A. PATTERSON.

Witnesses:
M. P. SMITH,
R. M. KIMBROUGH.